United States Patent [19]

Kato et al.

[11] 4,416,242

[45] Nov. 22, 1983

[54] INTAKE HEATING APPARATUS OF AN INTERNAL COMBUSTION ENGINE

[75] Inventors: Keigo Kato; Yosio Kuroiwa, both of Toyota, Japan

[73] Assignee: Toyota Jidosha Kogyo Kabushiki Kaisha, Toyota, Japan

[21] Appl. No.: 351,310

[22] Filed: Feb. 22, 1982

[30] Foreign Application Priority Data

Oct. 5, 1981 [JP] Japan .............................. 56-157533

[51] Int. Cl.³ ............................................. F07M 31/00
[52] U.S. Cl. .................................... 123/549; 123/545; 261/142; 219/207
[58] Field of Search ............... 123/549, 545, 546, 552; 261/142; 219/205, 206, 207

[56] References Cited

U.S. PATENT DOCUMENTS

| | | | |
|---|---|---|---|
| 1,472,233 | 10/1923 | Taylor | 123/549 |
| 2,700,722 | 1/1955 | Gurley | 123/549 |
| 4,108,125 | 8/1978 | Marcoux | 123/549 |
| 4,327,697 | 5/1982 | Wada | 123/549 |
| 4,366,798 | 1/1983 | Tasaka | 123/545 |
| 4,377,148 | 3/1983 | Ishida | 123/549 |

FOREIGN PATENT DOCUMENTS 55-72647  5/1980  Japan .............................. 123/549

*Primary Examiner*—Ronald H. Lazarus
*Attorney, Agent, or Firm*—Kenyon & Kenyon

[57] ABSTRACT

An intake heating apparatus of an internal combustion engine, comprising a hollow heater vessel which is placed in an intake passage of the engine and which comprises an inner pipe, an outer pipe in which said inner pipe is press-fitted, a PTC element holder located between the inner and outer pipes for holding peripherally spaced PTC elements, and an annular elastic electrode located between the PTC elements and the outer pipe. The PTC element holder has holes in which the PTC elements are held. The lower edges of the holes are off-set from the lower end of the elastic electrode.

6 Claims, 11 Drawing Figures

INTAKE HEATING APPARATUS OF AN INTERNAL COMBUSTION ENGINE

The present invention relates to an apparatus for promoting the vaporization of liquid fuel in an internal combustion engine.

The low engine temperature before completion of the engine warm-up results in insufficient vaporization of the fuel supplied from the carburetor. The supply of a large quantity of fuel into the engine cylinders in the liquid state before completion of the engine warm-up results in a poorer performance than that achieved after completion of the warm-up, whereby a stable operation of the engine cannot be obtained before completion of the warm-up. Accordingly, during warm-up, an air-fuel mixture, which is richer than the air-fuel mixture used after completion of the warm-up, is supplied into the engine cylinders so as to maintain a stable engine operation. However, the supply of such a richer air-fuel mixture to the engine cylinders causes not only an increase in the amount of poisonous components, such as unburnt hydrocarbones HC and carbon monoxide gas CO in the exhaust, but also causes an increase in the fuel comsumption. Accordingly, sufficient vaporization of the liquid fuel supplied from the carburetor during engine warm-up would enable a stable engine operation to be achieved, even with a reduced air-fuel mixture. The use of such a reduced air-fuel mixture would allow control of the formation of poisonous components in the exhaust gas and a reduction in the fuel consumption. An assignee of the present invention previously proposed an intake heating apparatus for promoting vaporization of a liquid fuel during the engine warm-up, which apparatus comprises a hollow heating element vessel attached to, for example, the outlet portion of a carbureter air horn, said hollow heating element vessel including an inner pipe, an outer pipe, and a plurality of positive temperature coefficient thermistors (hereinafter referred to as "PTC elements") inserted between the inner and outer pipes, wherein the inner pipe of the hollow heating element vessel is heated by heating the PTC elements.

Since the present invention is directed to an improvement of this type of intake heating apparatus, and particularly to an improvement of an insulating member located between the inner pipe and the PTC elements, the discussion below will first be directed to the construction of the intake heating apparatus, with reference to FIGS. 1-9 of the accompanying drawings, in which.

Figure 1:
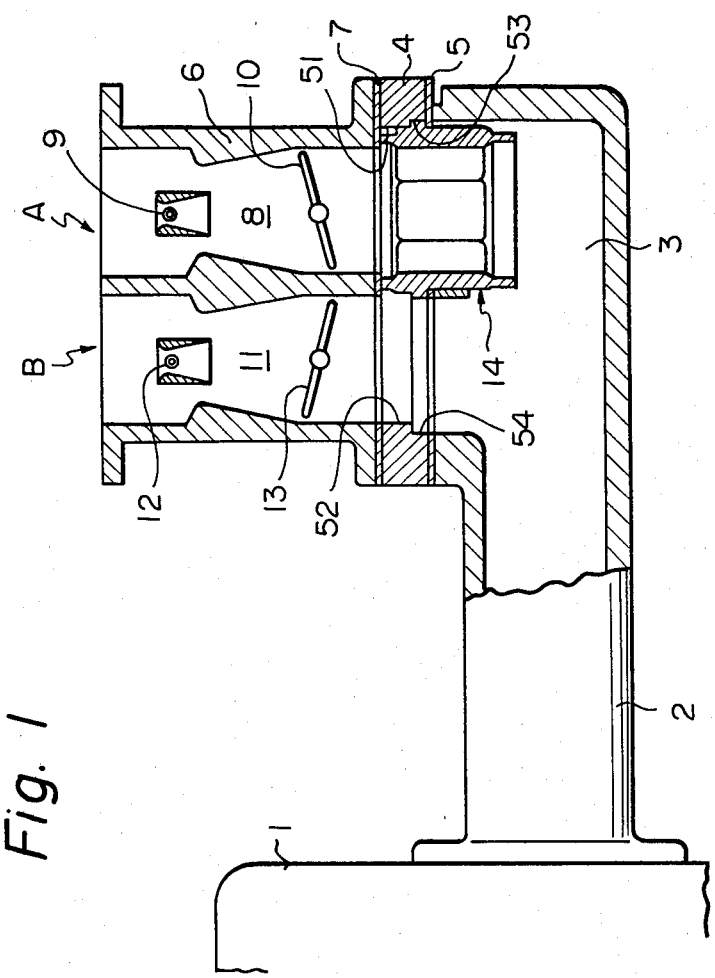
FIG. 1 is a sectional side view of the intake system of an engine according to a prior application of an assignee of this invention.
Figure 2:
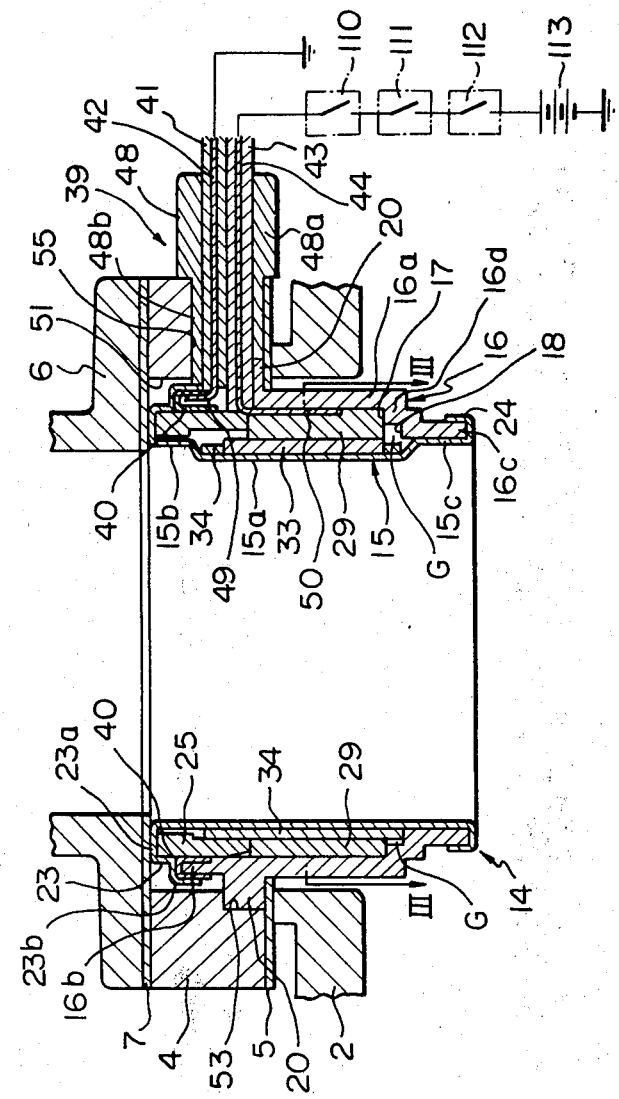
FIG. 2 is a cross-sectional side view of the heating element vessel in FIG. 1 taken along the line II—II in FIG. 3.
Figure 3:
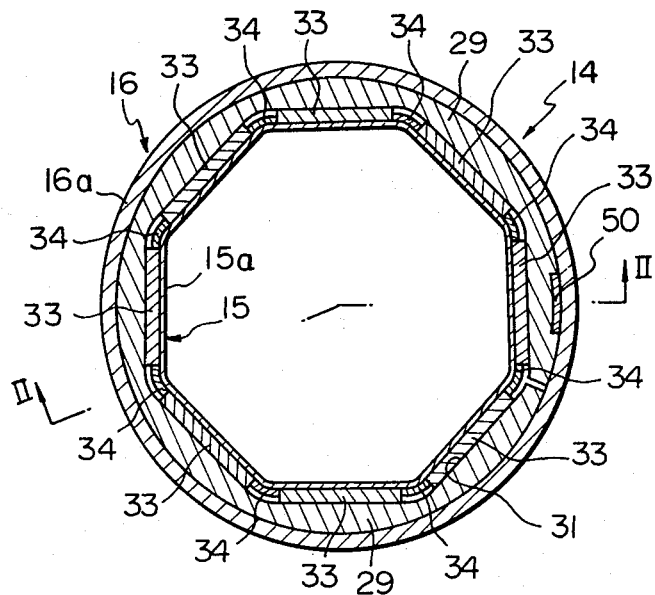
FIG. 3 is a cross-sectional plan view taken along the line III—III in FIG. 2.
Figure 4:
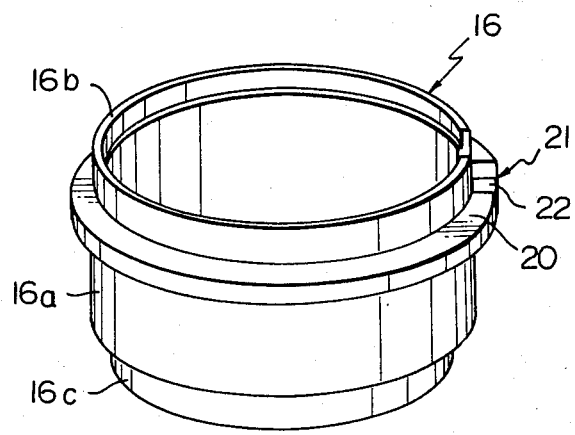
FIG. 4 is a perspective view of the outer pipe shown in FIG. 2.

In FIG. 1, reference numerals 1, 2, 3, 4, and 6 designate an engine body, an intake manifold, a collecting portion of the intake manifold 2, a heat-insulating plate of a plastic material attached onto the collecting portion 3 via a gasket 5, and a carburetor secured to the heat-insulating plate 4 via a gasket 7, respectively. The carburetor 6 has a primary carburetor A and a secondary carburetor B. The primary carburetor A is provided with a primary air horn 8, a primary main nozzle 9, and a primary throttle valve 10, and the secondary carburetor B is provided with a secondary air horn 11, a secondary main nozzle 12, and a secondary throttle valve 13. As shown in FIG. 1, a hollow heating element vessel 14 is arranged in the heat insulating plate 4 in the lower end portion of the primary carburetor A in alignment with the primary air horn 8 and is projected into the collecting portion 3. As shown in FIGS. 2 and 3, this hollow heating element vessel 14 comprises an inner pipe 15 composed of a thin metallic material and an outer pipe 16 composed of a thin plastic material. As illustrated in FIG. 4 the outer pipe 16 has an intermediate portion 16a having a uniform inner diameter, a top end portion 16b having an inner diameter slightly larger than the inner diameter of the intermediate portion 16a, and a lower end portion 16c having an inner diamter smaller than the inner diameter of the intermediate portion 16a. An inwardly descending step portion 16d (FIG. 2) is formed between the intermediate portion 16a and the lower end portion 16c, and this step portion 16d comprises a first annular shoulder 17 extending in the radial direction, and a second annular shoulder 18 extending in the radial direction and located below the first annular shoulder 17. An annular flange 20 having a rectangular section is integrally formed on the back surface of the intermediate portion 16a at a position adjacent to the top end portion 16b. Furthermore, a cut-away portion 21 (FIG. 4), extending from the top end portion 16b into the flange 20, is formed on the outer pipe 16, and a flat face, extending in the radial direction, is formed on the bottom 22 of the cut-away portion 21. The intermediate portion 16a of the outer pipe 16 is provided, on its inner periphery, with a tapered groove (not shown) which becomes wider toward the upward end and which is located corresponding to the cut-away portion 21. As described hereinbefore, this outer pipe 16 is integrally molded from a plastic material, but the outer pipe 16 may also be formed from a metallic material.

Figure 5:
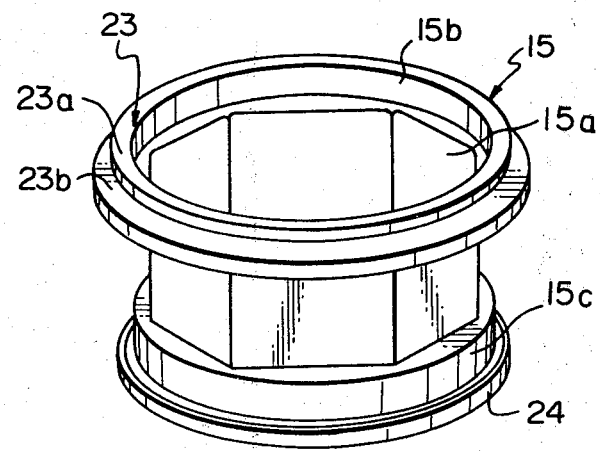
FIG. 5 is a perspective view of the inner pipe shown in FIG. 2.

As shown in FIGS. 2, 3, and 5, the inner pipe 15 has an intermediate portion (contact surface portion) 15a having an octahedral section, a cylindrical top end portion 15b, and a cylindrical lower end portion 15c. The inner diameter of the cylindrical top end portion 15b is the same as the inner diameter of the cylindrical lower end portion 15c, and the intermediate portion 15a as a whole expands inwardly from the cylindrical top end portion 15b and cylindrical lower end portion 15c. A step-like flange 23 extending outwardly is integrally formed on the top end of the cylindrical top end portion 15b. This step-like flange 23 comprises an inner flange 23a having an L-shaped section and extending outwardly beyond the top end of the cylindrical top end portion 15b and an outer flange 23b having an L-shaped section and extending outwardly beyond the tip of the inner flange 23a. Furthermore, a flange 24 having an L-shaped section and extending outwardly is integrally formed on the top end of the cylindrical lower end portion 15c, and as shown in FIG. 2, this flange 24 is fitted onto the lower end portion 16c of the outer pipe 16.

As shown in FIG. 2, an insulating ring 25, composed of a heat-resistant fluorine resin, such as polytetrafluoroethylene, or a heat-resistant rubber, such as a silicone rubber, is inserted between the inner pipe 15 and the outer pipe 16, and is fitted in the inner flange 23a of the inner pipe 15.

Figure 6:
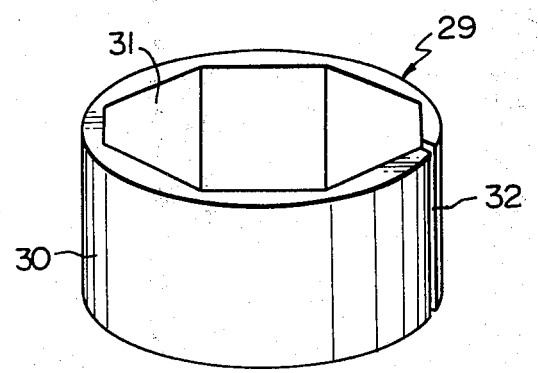
FIG. 6 is a perspective view of the elastic electrode shown in FIG. 2.

As shown in FIGS. 2 and 3, an annular elastic electrode 29 composed of graphite is inserted between the inner pipe 15 and the outer pipe 16. As shown in FIG. 6, this elastic electrode 29 has a cylindrical peripheral face 30 and an inner circumferential face 31 having an octahedral section, and is separated by a slit 32 extending in the axial direction. As is seen from FIG. 3, the elastic electrode 29 is inserted between the inner and outer pipes 15 and 16, so that respective flat faces constituting the octahedron of the inner circumferential face 31 of the elastic electrode 29 confront the corresponding flat faces constituting the octahedron of the inner pipe 15. Furthermore, the axial length of this elastic electrode 29 is shorter than the length of the intermediate portion 15a of the inner pipe 15, and the elastic electrode 29 is arranged in the region of this intermediate portion 15a of the inner pipe 15.

Figure 8:
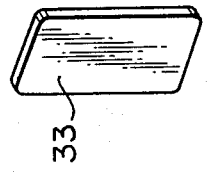
FIG. 8 is a perspective view of the PTC element.
Figure 7:
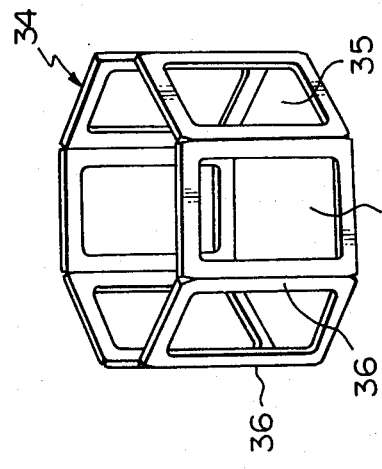
FIG. 7 is a perspective view of the insulating member shown in FIG. 2, at the time of insertion.

A PTC element 33 is inserted into each of the gaps between the flat faces of the peripheral face of the intermediate portion 15a of the inner pipe 15 and the elastic electrode 29, and, furthermore, an insulating member 34, having a thickness smaller than that of each PTC element 33, is inserted to surround the peripheral walls of said PTC elements 33. The insulating member 34 is composed of belt-like asbestos which is rounded to provide an annular PTC element holder and eight holes 35 are equidistantly formed on the insulating member or PTC element holder 34 (FIG. 7). As shown in FIG. 8, each PTC element 33 has a rectangular plate-like shape, and the holes 35 of the insulating member 34 have a contour substantially the same as that of the PTC elements 33. The holes 35 are separated from one another by ribs 36 arranged equidistantly. The respective flat faces constituting the octahedron of the insulating member 34 are arranged on the corresponding flat faces constituting the octahedron of the inner pipe 15, and the PTC elements 33 are inserted into the corresponding holes 35 of the insulating member 34.

Figure 9:
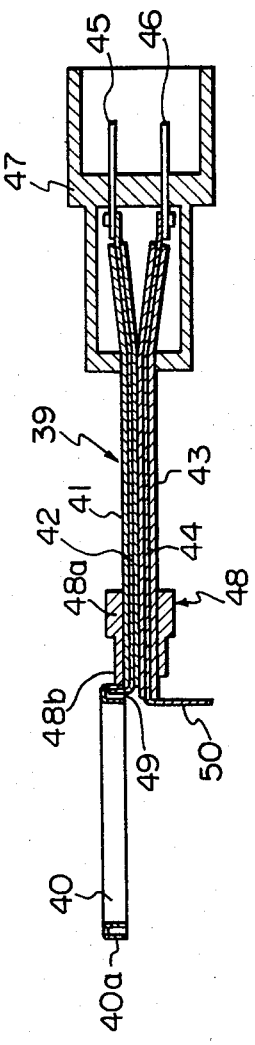
FIG. 9 is a cross-sectional side view of the electrode unit shown in FIG. 2.

An electrode unit 39, extending outwardly in the radial direction, is attached to the upper end portion of the hollow heating element vessel 14. This electrode unit 39 comprises, as shown in FIG. 9:

A metal ring 40 having a U-shaped section, a band-like negative side lead 42 covered with an insulating tube 41, a band-like positive-side lead 44 covered with an insulating tube 43, and a connector 47 provided with a pair of terminals 45 and 46. The insulating tubes 41 and 43 are overlapped and a retainer 48, formed of a rubber material, is inserted on the peripheries of the overlapped tubes 41 and 43. As shown in FIG. 9, the inner end 49 of the negative side lead 42 is upwardly bent at a right angle, and the bent inner end 49 is welded in the U-shaped section of the ring 40. The outer end of the negative side lead 42 is connected to the terminal 45 of the connector 47. The inner end 50 of the positive side lead 44 is downwardly bent in the direction opposite to the bending direction of the bent inner end portion 49 of the negative side lead 42, and the outer end of the positive side lead 44 is connected to the terminal 46 of the connector 47. As shown in FIG. 2, the U-shaped section of the ring 40 is fitted in the top end portion 16b of the outer pipe 16, and the outer flange 23b of the inner pipe 15 is fitted onto the ring 40. The bent inner end 50 of the positive side lead 44 is inserted between the intermediate portion 16a of the outer pipe 16 and the elastic electrode 29.

As shown in FIG. 1, a large-diameter hole 51 and a small-diameter hole 52, which are connected to each other, are formed on the heat insulating plate 4, and the hollow heating element vessel 14 is placed in the large-diameter hole 51. The small-diameter hole 52 is arranged in alignment with the secondary air horn 11. Grooves 53 and 54, having an L-shaped section, are formed along the entire length of the lower side portion of the inner circumferential wall face of the heat insulating plate 4 defining the large-diameter hole 51 and small-diameter hole 52, and the flange 20 integrally formed on the peripheral wall face of the outer pipe 16 is fitted in the groove 53 of the large-diameter hole 51. Further, a dovetail groove 55 (FIG. 2) is formed on the lower side wall face of the heat insulating plate 4, and the inner side portion 48b of the retainer 48 is fitted in this dovetail groove 55.

The operation of the apparatus is as follows.

The negative side lead 42 is grounded, and the positive side lead 44 is connected to a power source 113 through a temperature detecting switch 110, a neutral point voltage detecting switch 111, and an ignition switch 112. The temperature detecting switch 110 is turned on when the temperature of the engine cooling water is lower than, for example, 60° C., and is turned off when the temperature of engine cooling water exceeds 60° C. The neutral point voltage detecting switch 111 is turned off when the neutral point voltage of the engine-driven alternator is lower than a predetermined level, and is turned on when this neutral point voltage exceeds the predetermined level.

Since a large current flows at the time of starting the supply of the electric current, it is necessary that the supply of the electric current to the PTC element 33 not be started while the starter motor is actuated to start the engine. The engine is equipped with a neutral point voltage detecting switch 111 for this purpose. More specifically, while the engine is rotated by the starter motor, the neutral point voltage is low, and when the engine is rotated by its own power, the neutral point voltage is increased, the neutral point voltage detecting switch is turned on, and the supply of the electric current to the PTC element 33 is started. When the supply of the electric current to the PTC element 33 is thus started, the temperature of the PTC element is immediately elevated and, therefore, the temperature of the inner pipe 15 is immediately elevated.

When the engine is started, the majority of the liquid fuel supplied from the primary carburetor A flows down along the inner wall face of the primary air horn 8. This liquid fuel flows down along the inner wall face of the inner pipe 15. The outer pipe 16 is formed of a heat insulating material and is supported by the heat insulating plate 4. Accordingly, only a very small proportion of heat generated by the PTC element 33 escapes to the intake manifold 2 and the carburetor 6. The majority of heat generated by the PTC element 33 is used for heating the inner pipe 15. Since the inner wall face of the inner pipe 15 is covered with liquid fuel, the majority of heat generated by the PTC element 33 is used for vaporizing the liquid fuel. Furthermore, since the intermediate portion 15a of the inner pipe 15 expands inwardly from the top end portion 15b of the inner pipe 15, adhesion of fuel drops floating in the air-fuel mixture to the intermediate portion 15a of the inner pipe 15 is accelerated, and vaporization of the fuel is further promoted.

When a certain time has passed from the point of starting the engine and the temperature of engine cooling water exceeds 60° C., the temperature detecting switch 110 is turned off to stop the supply of the electric current to the PTC element 33.

As is well known, graphite has a directional property in heat conductivity, and heat conductivity in the radial direction is lower than heat conductivity in the circumferential direction. Accordingly, heat is not smoothly conducted in the radial direction in graphite, and hence, the elastic electrode 29 exerts a heat insulating action. Furthermore, as pointed out hereinbefore, the outer pipe 16 is formed of a heat insulating material, and the elastic electrode 29 has a heat insulating action. Therefore, the majority of heat generated by the PTC elements can be used for heating the inner pipe 15. Still further, since heat is smoothly conducted in the circumferential direction in graphite, the inner pipe 15 can be heated uniformly.

In the above mentioned type of intake heating apparatus, an electrical insulation between the elastic electrode 29 and the inner pipe 15 can be provided by the insulation ring 25 at the upper end of the electrode and by the insulating member (i.e. the PTC element holder) 34 at the lower end of the electrode. However, these insulating elements have caused undesirable problems. That is, on one hand when the insulation ring 25 is press-fitted into the outer pipe 16, the top end portion 16b of the outer pipe 16 often becomes cracked, and, on the other hand, when the inner pipe 15 is press-fitted into the outer pipe 16, the graphite, of which the elastic electrode 29 is made, is easily scraped off. Pieces of graphite thus scraped off may short-circuit the apparatus. When an inner pipe assembly which is composed of the inner pipe 15, the PTC element holder 34 having the PTC elements 33 fitted therein, and the graphite electrode 29 covering the outer faces of the PCT elements 33, is press-fitted into the outer pipe 16, the outer periphery of the electrode 29 comes into direct contact with the outer pipe 16, so that the outer periphery of the graphite electrode 29 is forcedly scratched by the inner periphery of the outer pipe 16. Since graphite is relatively brittle, the outer periphery of the graphite electrode 29 is partly scraped by the inner periphery of the outer pepe 16, so that the scraped pieces of graphite are stuck to the inner periphery of the outer pipe 16. Since the scraped pieces may cause the apparatus to short-circuit, it is necessary not only to separate and collect the graphite pieces stuck to the inner periphery of the outer pipe 16 by the insulation ring 25 when the inner pipe assembly is press-fitted into the outer pipe 16, but also to strongly press the insulation ring 25 against the inner periphery of the outer pipe in order to prevent the separated graphite pieces from coming into the inner periphery of the insulation ring 25. For this purpose, it is necessary to increase the press-fitting force of the insulation ring 25. However, since the outer pipe 16 is made of a thin walled plastic material, it can be easily broken, espacially at or near its top end portion 16b, by the large press-fitting force of the insulation ring 25.

Furthermore, there is a possibility that the graphite electrode 29 may be partly forced into slight gaps which may occur between the lower edges of the holes 35 of the holder 34 and the lower edges of the corresponding PTC elements 33 arranged therein particularly when the electrode 29 has an axial length longer than a predetermined (designed) value, because of a possible error of manufacturing. The presence of the graphite electrode in the slight gaps also tends to short-circuit the apparatus.

Still furthermore, since the outer pipe 16 has a circular periphery defined by a circle connecting the apexes of a regular polygon formed by the PTC element holder 34, at the lower end of the holder 34, there is provided a slight gap G (FIG. 2) between the outer pipe 16 and the holder 34, except for the apexes of the regular polygon at which the holder 34 is in contact with the outer pipe 16. The gap G tends to also cause the apparatus to short-circuit, since the scraped graphite pieces can come into the gap G, for example, due to the vibration of the vehicle. The reason why the inner periphery of the outer pipe 16 and the outer periphery of the holder 34 have different profiles, in spite of the provision of the inevitable gap G therebetween, is that the circular profile of the inner periphery of the outer pipe 16 makes it easy to assemble the outer pipe 16 and the holder 34. That is, when the holder 34 is assembled in the outer pipe 16, which has a circular inner periphery, it is not necessary to pay any attention to the relative angular and positional relationship (phase difference) between the outer pipe 16 and the holder 34.

The primary object of the present invention is, therefore, to eliminate the above mentioned drawbacks by providing an intake heating apparatus which is free from an occurrence of a short-circuit and which can be easily assembled.

Figure 10:
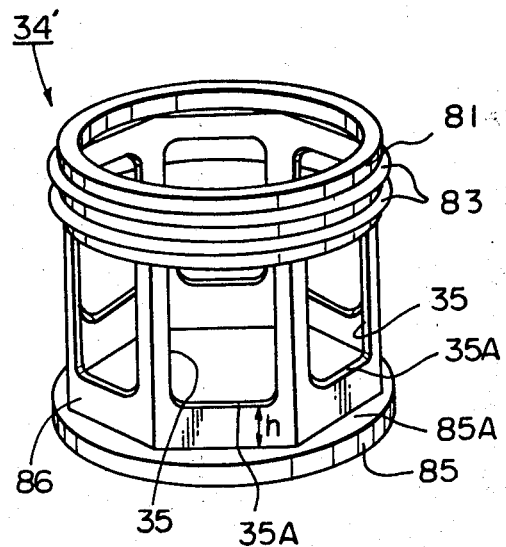
FIG. 10 is a perspective view of a PTC element holder according to the present invention; and, FIG. 11 is a cross-sectional side view of a heating element vessel, according to the present invention.
Figure 11:
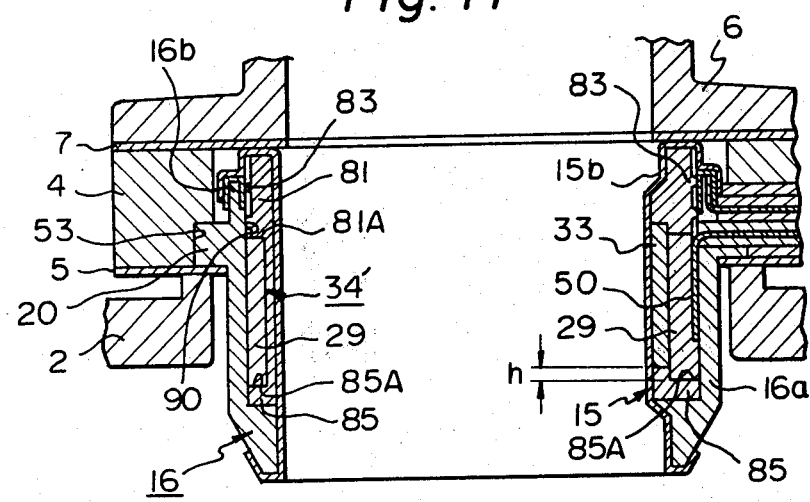

FIGS. 10 and 11 show an improved PTC element holder 34' and a heating element vessel incorporating the PTC element holder 34' according to the present invention, respectively.

According to the present invention, the insulating member, i.e. the PTC element holder 34', has a cylindrical head 81, a regular octagonal body 86, and an annular bottom disc plate 85. The head 81 is provided, on its outer periphery, with, for example, two beads 83. The number of the beads 83 may be one, or more than one. The disc plate 85 has an upper surface 85A which is loaded below the portion indicated by "h" and also below the lower edges of the holes 35 in which the PTC elements 33 (FIG. 8) are fitted. The outer diameter of the beads 83 is identical to that of the disc plate 85. The inner periphery of the cylindrical head 81 forms a circle connecting the apexes of the regular octagon of the body 86 having holes 35. The bottom disc plate 85 has a regular octagonal inner periphery corresponding to the regular octagonal body 86. The term "regular octagon" or "regular octagonal" used herein can be generally replaced by "regular polygon" or "regular polygonal" in order to achieve the object of the present invention.

The head 81, the body 86, and the bottom plate 85 are preferably integrally formed.

When the PTC element holder 34' is incorporated in the heating element vessel, as shown in FIG. 11, the beads 83 are pressed against the inner wall 90 of the outer pipe 16, and the cylindrical outer periphery of the head 81, other than the beads 83, does not substantially come into contact with or only slightly touches, at the most, the inner wall 90 of the outer pipe 16. Therefore, the press-fitting force acting on the outer pipe 16 in FIG. 11 is rather smaller than that in FIG. 2, so that there is no fear that the thin walled top end portion 16b of the outer pipe 16 will be broken. Furthermore, in spite of the fact that the press-fitting force is small, the beads 83 ensure that the graphite pieces (powders) stuck to the inner wall 90 of the outer pipe 16 are scraped and held, similarly to FIG. 2. Thus, according to the present invention, at least one bead 83 provides a large surface pressure without increasing the press-fitting force.

The disc plate 85, provided on the bottom of the holder 34', has a circular outer periphery, and, accordingly, no gap occurs between the disc plate 85 of the holder 34' and the outer pipe 16.

Since the disc plate 85 has the upper surface 85A, the disc plate 85 comes into contact with the bottom face of the electrode 29 over the entire periphery of the electrode, without any gap.

When the inner pipe assembly is press-fitted in the outer pipe, it is not necessary to pay attention to the relative angular positional relationship (phase difference) between the holder 34' and the outer pipe 16, similar to FIG. 2.

Since the lower end of the electrode 29 is located below the portion indicated by "h", and also below the lower edges 35A of the holes 35 of the holder 34', the graphite pieces (powders) or burrs scraped or peeled off from the graphite electrode 29 at the lower end of the electrode, when the inner pipe assembly is press-fitted in the outer pipe, cannot come into the holder 34' through the gaps between the lower edges of the PTC elements 33 and the lower edges 35A of the corresponding holes 35 of the holder 34'. This can be easily understood when FIG. 10 is compared with FIG. 2, in which the lower end of the electrode 29 is flush with the lower edges of the holes 35 of the PTC element holder 34. The off-set value "h" between the lower end of the electrode 29 and the lower edges 35A of the holes 35, in the present invention, excludes the possibility of graphite pieces (powders) entering the holder 34' through the gap between the holes 35 and the corresponding PTC elements 33, so that no short-circuit, due to the graphite pieces, occurs.

Finally, it should be noted that the insulation ring 25 in FIG. 2 is replaced by the cylindrical head 81 of the PTC element holder 34' in the present invention and, accordingly, can be dispensed with.

We claim:

1. An intake heating apparatus of an internal combustion engine comprising a hollow heater vessel, which is placed in an intake passage between a fuel supply means and a cylinder of the engine to heat an intake, said hollow heater vessel comprising: an inner pipe having therein a mixture passage which is aligned with the intake passage; an outer pipe in which said inner pipe is press-fitted; an insulating annular PTC element holder which is located between said inner pipe and said outer pipe and which has holes in which PTC elements are fitted and held; and an annular elastic electrode which is connected to an external electrical power supply and is located between the PTC elements and the outer pipe, so that the electrode comes into contact with the PTC elements, whereby the inner pipe is heated by heating the PTC elements to heat the intake passing through the heater vessel, said holes of the PTC element holder having lower edges which are off-set from the lower end of the elastic electrode.

2. An apparatus according to claim 1, wherein said lower end of the elastic electrode is located below the lower edges of the holes of the PTC element holder.

3. An intake heating apparatus of an internal combustion engine comprising a hollow heater vessel, which is placed in an intake passage between fuel supply means and a cylinder of the engine to heat an intake, said hollow heater vessel comprising: an inner pipe having therein a mixture passage which is aligned with the intake passage; an outer pipe in which said inner pipe is press-fitted; an insulating annular PTC element holder which is located between said inner pipe and said outer pipe and which has holes in which PTC elements are fitted and held; and an annular elastic electrode which is connected to an external electrical power supply and is located between the PTC elements and the outer pipe, so that the electrode comes into contact with the PTC element, whereby the inner pipe is heated by heating the PTC elements to heat the intake passing through the heater vessel, said PTC element holder comprising a regular polygonal body which has spaced holes at its periphery for holding the PTC elements, a cylindrical head which has at least one outer peripheral bead pressing against the inner wall of the outer pipe and which is integrally connected to the regular polygonal body, and a bottom disc plate which is integrally connected to the regular polygonal body and which bears against the inner wall of the outer pipe, said holes of the PTC element holder having lower edges which are off-set from the lower end of the elastic electrode.

4. An apparatus according to claim 3, wherein said lower end of the elastic electrode is located below the lower edges of the holes of the PTC element holder.

5. An apparatus according to claim 3, wherein said bead of the head and the bottom disc plate of the PTC element holder have a same outer diameter.

6. An apparatus according to claim 5, wherein said bottom disc plate of the PTC element holder has an upper peripheral surface which holds the lower end face of the electrode over the entire periphery of the electrode.

* * * * *